United States Patent
Fry et al.

(10) Patent No.: US 9,946,053 B1
(45) Date of Patent: Apr. 17, 2018

(54) SYSTEM AND METHOD FOR PROVIDING SWIR-MWIR REIMAGING ALONG A SAME OPTICAL PATH

(71) Applicant: LOCKHEED MARTIN CORPORATION, Bethesda, MD (US)

(72) Inventors: James Alexander Fry, Orlando, FL (US); Robert Joseph Murphy, Kissimmee, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 166 days.

(21) Appl. No.: 14/268,318

(22) Filed: May 2, 2014

Related U.S. Application Data

(60) Provisional application No. 61/818,815, filed on May 2, 2013.

(51) Int. Cl.
*G02B 13/14* (2006.01)

(52) U.S. Cl.
CPC .................. *G02B 13/146* (2013.01)

(58) Field of Classification Search
CPC .......... H04N 5/33–5/332; G02B 13/14; G02B 13/146; G02B 13/008
USPC ........ 359/350, 355–357, 362, 399, 423–424, 359/434; 348/164–167
See application file for complete search history.

(56) References Cited

U.S. PATENT DOCUMENTS

| | | | |
|---|---|---|---|
| 6,208,459 B1 | 3/2001 | Coon et al. | |
| 6,362,923 B1 | 3/2002 | Lange et al. | |
| 6,950,243 B2 | 9/2005 | Wiese et al. | |
| 7,280,273 B2 * | 10/2007 | Tejada | G02B 13/146 359/355 |
| 7,933,067 B1 | 4/2011 | Cook | |
| 8,101,918 B1 | 1/2012 | Mercado | |
| 9,110,276 B2 * | 8/2015 | Cook | G02B 13/146 |
| 2010/0246031 A1 * | 9/2010 | Caldwell | G02B 13/00 359/797 |
| 2012/0176671 A1 | 7/2012 | Cook | |

* cited by examiner

*Primary Examiner* — Stephone B Allen
*Assistant Examiner* — James McGee
(74) *Attorney, Agent, or Firm* — Terry M. Sanks, Esq.; Beusse Wolter Sanks & Maire, PLLC

(57) ABSTRACT

An optical system a plurality of lenses, arranged within a same optical path, configured to simultaneously pass and focus therethrough short-wave infrared (SWIR) and mid-wave infrared (MWIR) spectral bands to a common focal plane and provide simultaneous correction of monochromatic and chromatic aberrations over the SWIR and MWIR spectral bands is disclosed. Another system and a method are also disclosed.

17 Claims, 11 Drawing Sheets

| Material | VSWIR | VMWIR | |
|---|---|---|---|
| aln | 90.5 | 15.0 | |
| baf2 | 174.0 | 51.2 | |
| caf2 | 138.2 | 24.5 | |
| pbf2 | 84.3 | 52.9 | |
| lif | 80.5 | 9.8 | |
| mgf2 | 111.2 | 15.1 | |
| mgo | 81.2 | 13.7 | like alon |
| sapphire | 72.3 | 8.5 | |
| agcl | 77.9 | 245.2 | unique |
| znse | 42.2 | 219.1 | |
| MS-ZnS | 59.7 | 128.5 | |
| spinel | 76.5 | 10.2 | |
| amtir5 | 18.3 | 224.5 | |
| cdse | 21.7 | 205.3 | |
| beo | 83.7 | 7.1 | |
| amtir1 | 24.8 | 255.5 | |
| csbr | 113.8 | 500.1 | |
| irg100 | 23.7 | 214.1 | |
| kbr | 107.9 | 261.1 | |
| kcl | 138.0 | 168.4 | |
| krs5 | 33.7 | 302.5 | |
| nacl | 126.4 | 112.1 | |
| srf2 | 136.9 | 24.8 | |
| alon | 79.6 | 11.8 | like mgo |
| ig2 | 28.1 | 252.7 | |
| ig4 | 24.3 | 261.8 | |
| ig5 | 23.6 | 224.0 | |
| ig6 | 20.1 | 223.8 | |

*FIG. 1*

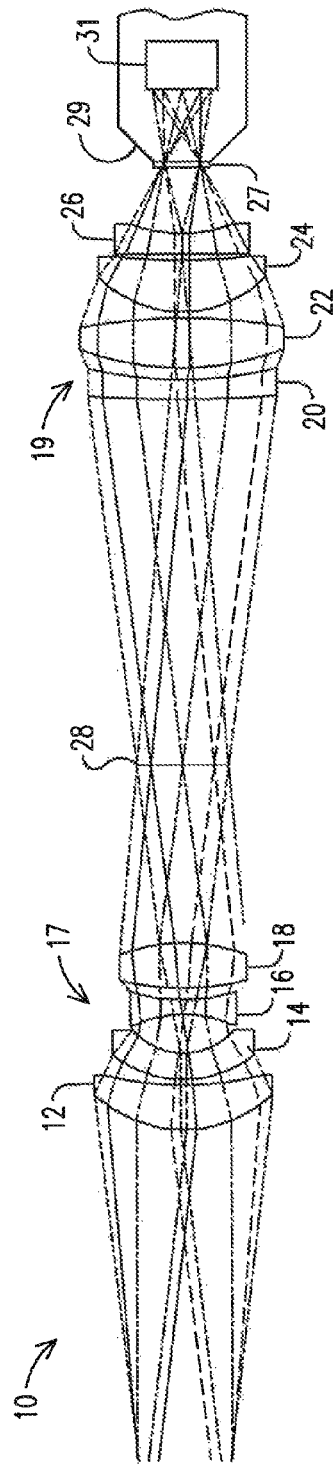
FIG. 3A
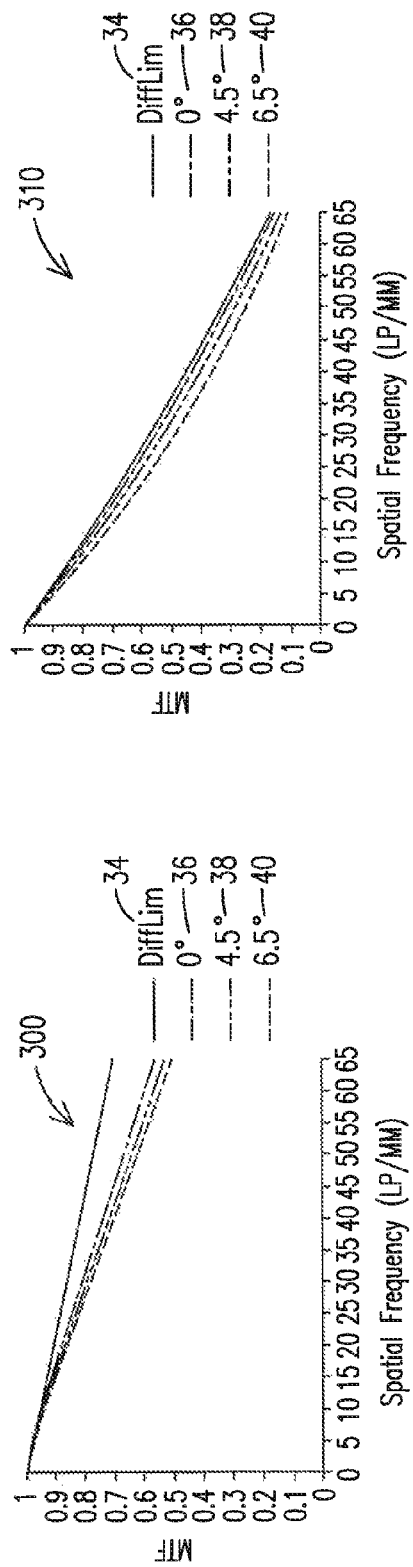
FIG. 3B
FIG. 3C

AgCl–AMTIR5–ALON–MS·ZnS  ← 320

| # | Curvature | Thickness | Glass | Conic | 4th | 6th | 8th | 10th |
|---|---|---|---|---|---|---|---|---|
| 0 | 0.0000 | Infinity | | 0 | 0 | 0 | 0 | 0 |
| 1 | 0.0000 | 5.9600 | | 0 | 0 | 0 | 0 | 0 |
| 2 | 0.4736 | 0.8000 | AGCL | −0.3131 | 0 | 0 | 0 | 0 |
| 3 | 0.1899 | 0.1000 | | 0 | −0.0005 | −0.0022 | 0.0004 | 0.0000 |
| 4 | 0.5230 | 0.4900 | AMTIR5 | 0 | 0.0000 | −0.0018 | 0.0000 | −0.0003 |
| 5 | 0.8116 | 0.6750 | | 0 | 0 | 0 | 0 | 0 |
| 6 | −0.4108 | 0.2750 | ALON | 0 | 0 | 0 | 0 | 0 |
| 7 | 0.3397 | 0.2250 | | 0 | 0 | 0 | 0 | 0 |
| 8 | 0.2695 | 0.8000 | ALON | −2.5958 | 0 | 0 | 0 | 0 |
| 9 | −0.3383 | 3.1000 | | 0 | 0 | 0 | 0 | 0 |
| 10 | 0.0000 | 6.8321 | | 0 | 0 | 0 | 0 | 0 |
| 11 | 0.0587 | 0.4000 | AMTIR5 | 15.8002 | 0 | 0 | 0 | 0 |
| 12 | 0.1286 | 0.2000 | | 0 | 0 | 0 | 0 | 0 |
| 13 | 0.2141 | 0.9000 | AGCL | 0 | −0.0012 | 0.0005 | −0.0004 | 0.0001 |
| 14 | −0.1194 | 0.1000 | | 0 | 0 | 0 | 0 | 0 |
| 15 | 0.5176 | 0.9250 | AGCL | 0 | −0.0008 | −0.0001 | −0.0002 | −0.0003 |
| 16 | 0.1045 | 0.0940 | | 0 | 0 | 0 | 0 | 0 |
| 17 | 0.0000 | 0.4000 | MS-ZnS | 0 | 0 | 0 | 0 | 0 |
| 18 | 0.3991 | 1.2661 | | 0 | 0 | 0 | 0 | 0 |
| 19 | 0.0000 | 1.2907 | | 0 | 0 | 0 | 0 | 0 |
| 20 | 0.0000 | 0.0000 | | 0 | 0 | 0 | 0 | 0 |

Units are in inches

*FIG. 3D*

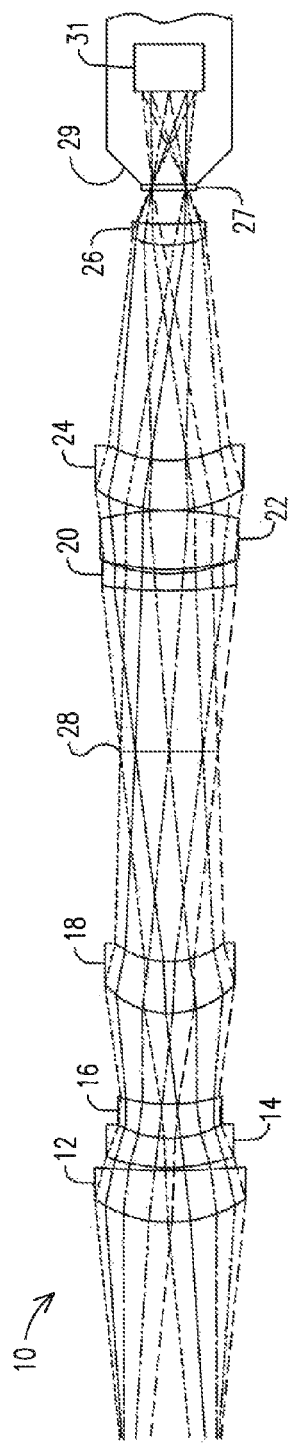
FIG. 4A
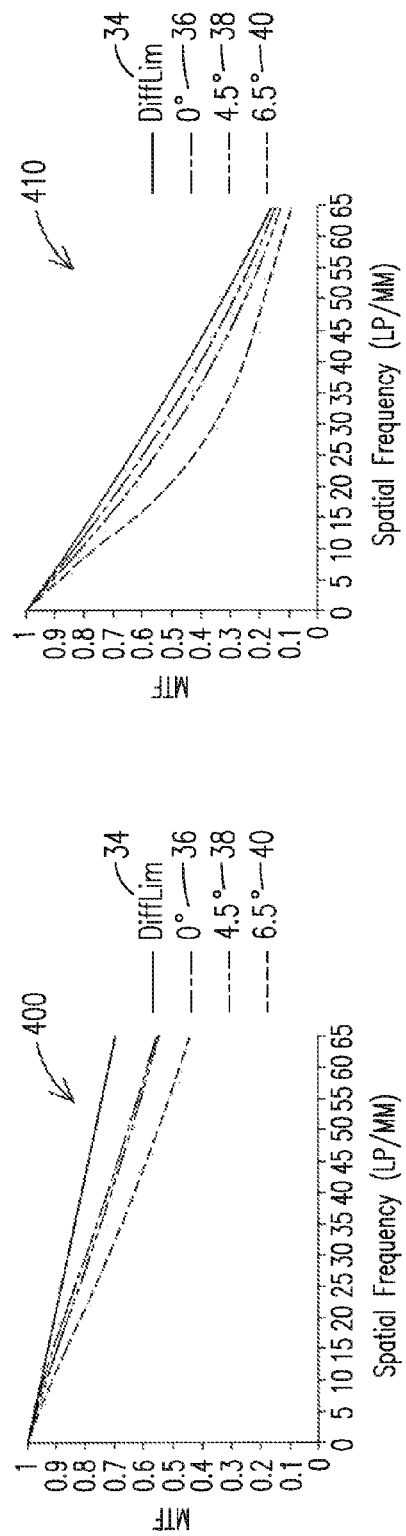
FIG. 4B
FIG. 4C

MS-ZnS-AMTIR5-ALON-IG6

420

| # | Curvature | Thickness | Glass | Conic | 4th | 6th | 8th | 10th |
|---|---|---|---|---|---|---|---|---|
| 0 | 0.0000 | Infinity | | 0 | 0 | 0 | 0 | 0 |
| 1 | 0.0000 | 3.5000 | | 0 | 0 | 0 | 0 | 0 |
| 2 | 0.3515 | 0.8000 | MS-ZnS | 0.3969 | 0 | 0 | 0 | 0 |
| 3 | 0.0392 | 0.0200 | | 0 | 0.0234 | −0.0130 | 0.0083 | −0.0023 |
| 4 | 0.2935 | 0.4910 | AMTIR5 | 0 | 0 | 0 | 0 | 0 |
| 5 | 0.5141 | 0.2690 | | 0 | 0 | 0 | 0 | 0 |
| 6 | −0.1347 | 0.3100 | ALON | 0 | 0.0952 | −0.1123 | 0.1080 | −0.0479 |
| 7 | 0.3411 | 1.4674 | | 0 | 0 | 0 | 0 | 0 |
| 8 | 0.7059 | 0.8530 | ALON | −0.4738 | −0.0258 | 0.0078 | −0.0044 | 0.0008 |
| 9 | 0.5409 | 3.6000 | | 0 | 0 | 0 | 0 | 0 |
| 10 | 0.0000 | 2.4000 | | 0 | 0 | 0 | 0 | 0 |
| 11 | 0.1410 | 0.2858 | IG6 | 0 | 0 | 0 | 0 | 0 |
| 12 | 0.3488 | 0.0695 | | 0 | 0 | 0 | 0 | 0 |
| 13 | 0.2361 | 0.9500 | MS-ZnS | 0 | 0 | 0 | 0 | 0 |
| 14 | −0.1633 | −0.0048 | | 0 | 0 | 0 | 0 | 0 |
| 15 | 0.3766 | 0.8200 | MS-ZnS | 0 | −0.0009 | 0.0070 | −0.0040 | 0.0014 |
| 16 | 0.3778 | 3.4994 | | 0 | 0 | 0 | 0 | 0 |
| 17 | 0.5250 | 0.3350 | MS-ZnS | 0 | −0.0125 | −0.0012 | −0.0185 | 0.0350 |
| 18 | 0.1272 | 0.5973 | | 0 | 0 | 0 | 0 | 0 |
| 19 | 0.0000 | 1.5309 | | 0 | 0 | 0 | 0 | 0 |
| 20 | 0.0000 | 0.0000 | | 0 | 0 | 0 | 0 | 0 |

Units are in inches

*FIG. 4D*

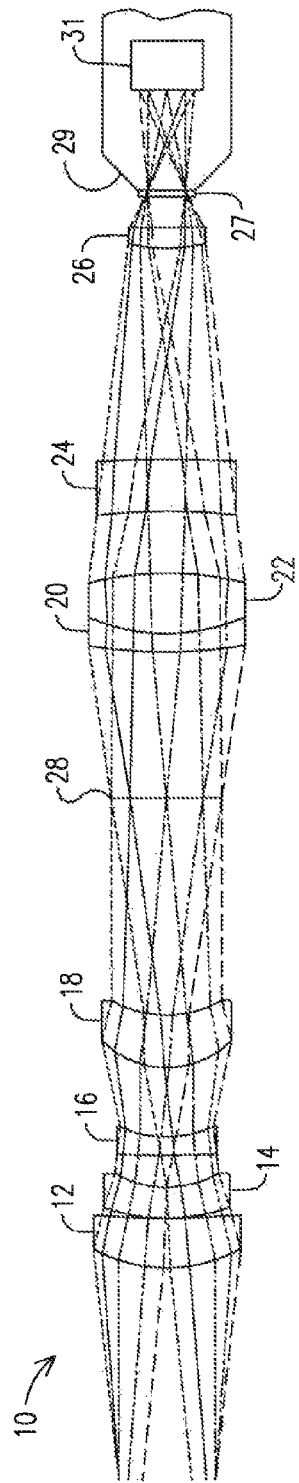
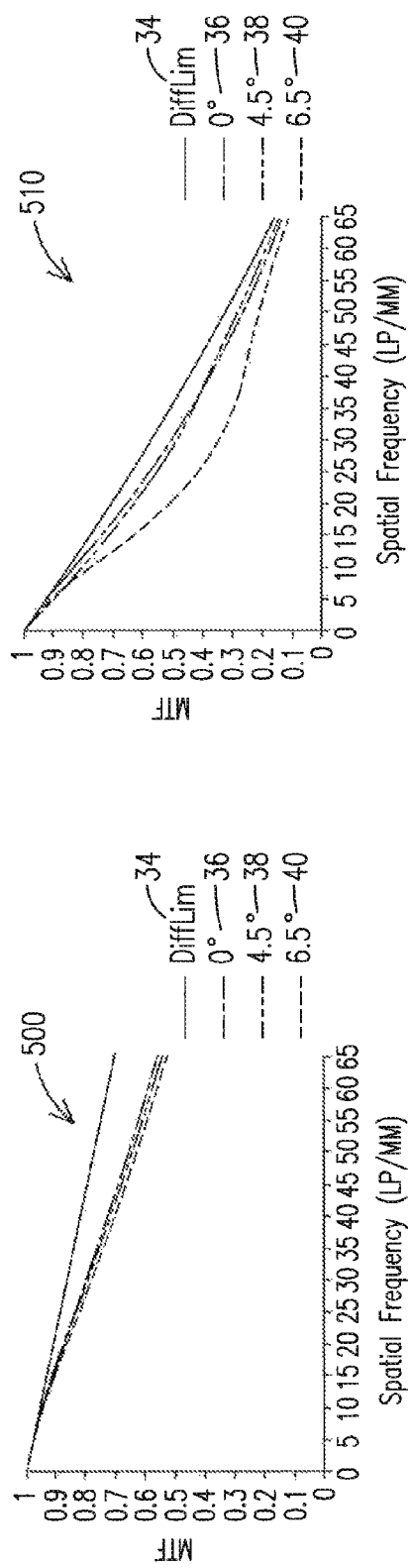
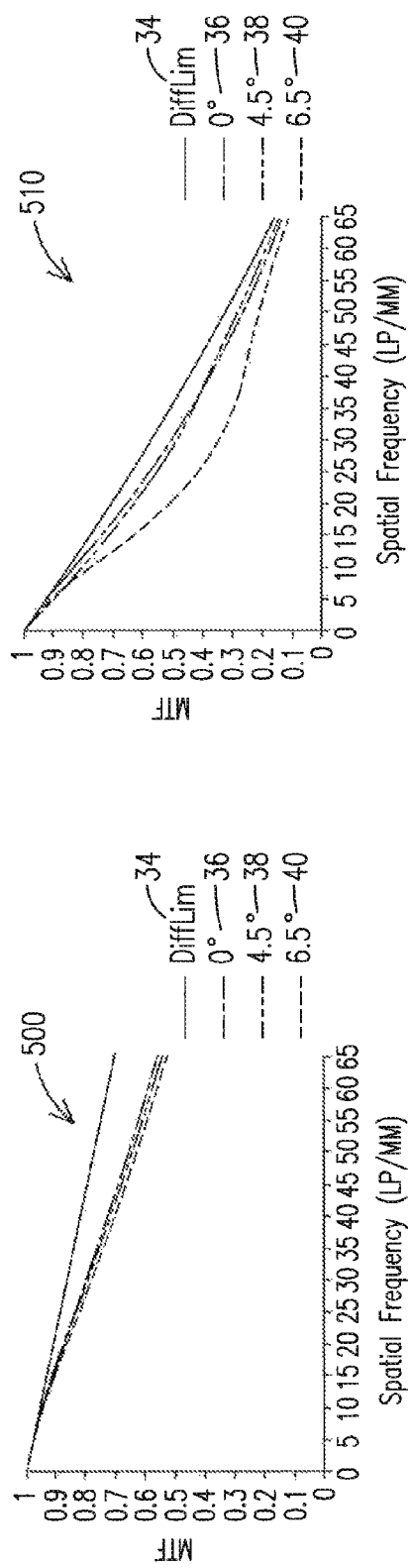
FIG. 5A
FIG. 5B
FIG. 5C

MS-ZnS-AMTIR5-ALON-CaF2       ← 520

| # | Curvature | Thickness | Glass | Conic | 4th | 6th | 8th | 10th |
|---|---|---|---|---|---|---|---|---|
| 0 | 0.0000 | Infinity | | 0 | 0 | 0 | 0 | 0 |
| 1 | 0.0000 | 3.5000 | | 0 | 0 | 0 | 0 | 0 |
| 2 | 0.3519 | 0.8000 | MS-ZnS | 0.7989 | 0 | 0 | 0 | 0 |
| 3 | 0.0292 | 0.0200 | | 0 | 0.0269 | −0.0097 | 0.0079 | −0.0024 |
| 4 | 0.2996 | 0.4910 | AMTIR5 | 0 | 0 | 0 | 0 | 0 |
| 5 | 0.5330 | 0.5259 | | 0 | 0 | 0 | 0 | 0 |
| 6 | −0.0767 | 0.3100 | ALON | 0 | 0.1341 | −0.1468 | 0.1789 | −0.0897 |
| 7 | 0.5022 | 1.1285 | | 0 | 0 | 0 | 0 | 0 |
| 8 | 0.7606 | 0.8530 | ALON | −0.3083 | −0.0520 | 0.0128 | −0.0118 | 0.0013 |
| 9 | 0.5611 | 3.6000 | | 0 | 0 | 0 | 0 | 0 |
| 10 | 0.0000 | 2.4000 | | 0 | 0 | 0 | 0 | 0 |
| 11 | 0.1335 | 0.2858 | AMTIR5 | 0 | 0 | 0 | 0 | 0 |
| 12 | 0.3012 | 0.0288 | | 0 | 0 | 0 | 0 | 0 |
| 13 | 0.2556 | 0.9500 | MS-ZnS | 0 | 0 | 0 | 0 | 0 |
| 14 | −0.1874 | 1.0447 | | 0 | 0 | 0 | 0 | 0 |
| 15 | −0.1212 | 0.8200 | CaF2 | 0 | −0.0119 | 0.0138 | −0.0077 | 0.0032 |
| 16 | −0.0488 | 3.5013 | | 0 | 0 | 0 | 0 | 0 |
| 17 | 0.3528 | 0.3350 | MS-ZnS | 0 | −0.0152 | 0.0168 | −0.0552 | 0.0632 |
| 18 | −0.0314 | 0.6222 | | 0 | 0 | 0 | 0 | 0 |
| 19 | 0.0000 | 1.6564 | | 0 | 0 | 0 | 0 | 0 |
| 20 | 0.0000 | 0.0000 | | 0 | 0 | 0 | 0 | 0 |

Units are in inches

*FIG. 5D*

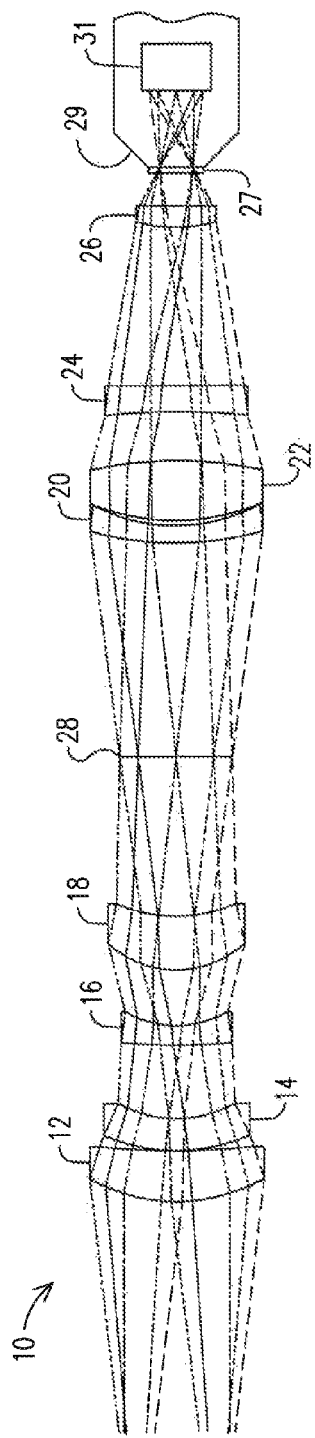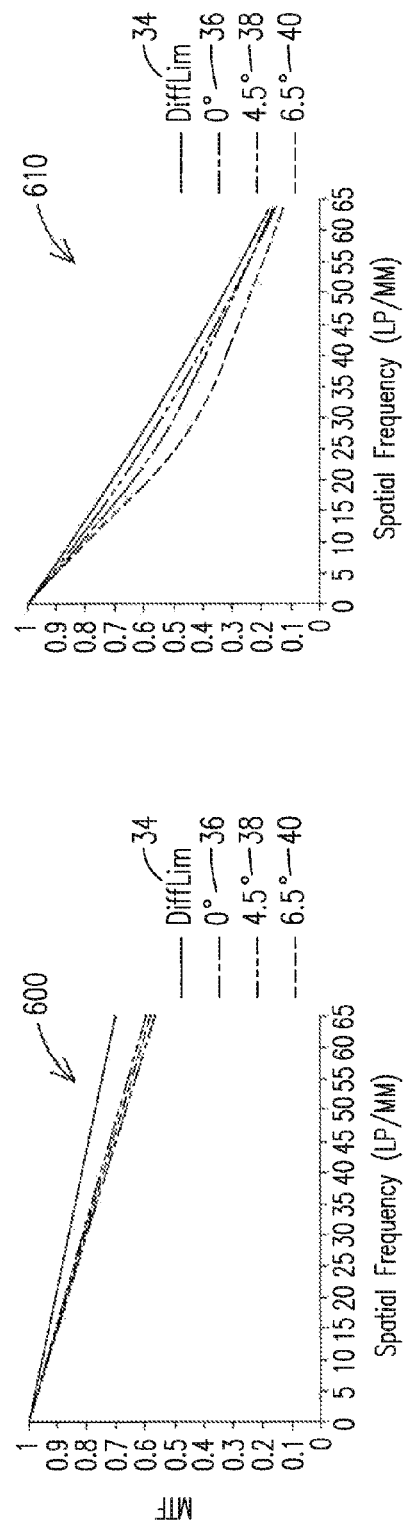
FIG. 6A
FIG. 6B
FIG. 6C

MS-ZnS-AMTIR5-ALON                                    ╱—620

| # | Curvature | Thickness | Glass | Conic | 4th | 6th | 8th | 10th |
|---|-----------|-----------|-------|-------|-----|-----|-----|------|
| 0 | 0.0000 | Infinity | | 0 | 0 | 0 | 0 | 0 |
| 1 | 0.0000 | 3.7000 | | 0 | 0 | 0 | 0 | 0 |
| 2 | 0.3373 | 0.8000 | MS-ZnS | 1.0995 | 0 | 0 | 0 | 0 |
| 3 | 0.0402 | 0.0200 | | 0 | 0.0207 | −0.0002 | 0.0002 | 0.0001 |
| 4 | 0.3281 | 0.4910 | AMTIR5 | 0 | 0 | 0 | 0 | 0 |
| 5 | 0.5512 | 1.2028 | | 0 | 0 | 0 | 0 | 0 |
| 6 | −0.0251 | 0.3100 | ALON | 0 | 0.1289 | −0.0385 | 0.0070 | 0.0001 |
| 7 | 0.6590 | 0.9100 | | 0 | 0 | 0 | 0 | 0 |
| 8 | 0.7184 | 0.8530 | ALON | −0.6356 | −0.0319 | 0.0059 | −0.0033 | 0.0008 |
| 9 | 0.3921 | 2.5000 | | 0 | 0 | 0 | 0 | 0 |
| 10 | 0.0000 | 3.5000 | | 0 | 0 | 0 | 0 | 0 |
| 11 | 0.2050 | 0.2858 | AMTIR5 | 0 | −0.0096 | 0.0059 | −0.0023 | 0.0004 |
| 12 | 0.3441 | 0.0600 | | 0 | 0 | 0 | 0 | 0 |
| 13 | 0.2982 | 0.9500 | MS-ZnS | 0 | 0 | 0 | 0 | 0 |
| 14 | −0.1419 | 0.8000 | | 0 | 0 | 0 | 0 | 0 |
| 15 | −0.0650 | 0.4100 | ALON | 0 | 0.0173 | −0.0241 | 0.0157 | −0.0044 |
| 16 | 0.0048 | 2.5770 | | 0 | 0 | 0 | 0 | 0 |
| 17 | 0.3287 | 0.3350 | MS-ZnS | 0 | −0.0178 | 0.0246 | −0.0756 | 0.0835 |
| 18 | −0.0837 | 0.5997 | | 0 | 0 | 0 | 0 | 0 |
| 19 | 0.0000 | 1.2484 | | 0 | 0 | 0 | 0 | 0 |
| 20 | 0.0000 | 0.0000 | | 0 | 0 | 0 | 0 | 0 |

Units are in inches

*FIG. 6D*

SYSTEM AND METHOD FOR PROVIDING SWIR-MWIR REIMAGING ALONG A SAME OPTICAL PATH

CROSS-REFERENCE TO RELATED APPLICATIONS

This application claims the benefit of U.S. Provisional Application No. 61/818,815 filed May 2, 2013, incorporated herein by reference in its entirety.

BACKGROUND

Embodiments relate generally to an optical imaging system and, in particular, to short-wavelength infrared ("SWIR") and mid-wavelength infrared ("MWIR" and collectively "SWIR-MWIR") reimager.

Optical reimagers are commonly used in infrared optical systems and can be formed from a wide variety of optical elements depending on system design constraints. Optical reimagers are used to form an intermediate image, and then translate an intermediate image into a final image. Cooled infrared detectors are commonly used in high-performance infrared systems that require high responsivity and low noise. These detectors typically have a cold shield with an aperture, commonly referred to as the cold stop which is provided to limit the solid angle of radiation detected by the detector to the solid angle of light focused by the optical system. The cold-shield efficiency of an infrared system that uses cooled infrared detectors is the ratio of the solid angle of the light focused by the lens to the solid angle subtended by the cold stop. Optimally, an infrared optical system has 100 percent cold-shield efficiency.

Reimaging optical systems are commonly used as a means of pupil control for infrared optical systems that have cooled detectors where the cold shield diameter of the infrared system is used as the aperture stop of the system. When multiple optical systems are combined into one larger optical system, reimaging optical systems are commonly used to create a real pupil position at the interface of two optical systems. Using reimaging optical systems to relay the image in a single wavelength band of the cold stop to the entrance aperture of the entire system in order to minimize the size and weight of larger aperture objective lenses is well known to those skilled in the art.

A design goal for any high-resolution imaging optical system is to achieve diffraction-limited performance over a field of view while minimizing aberrations that adversely affect image clarity. To achieve diffraction-limited performance, optical systems are configured to correct, or compensate for, various optical aberrations such as spherical, coma, astigmatism, distortion, and chromatic.

A reimager may be created by combining a relay (e.g., two or more mirrors or a lens group) with imaging optical elements. Reimagers typically contain multiple optical elements to correct aberrations and achieve desired diffraction-limited performance. However current reimagers are designed to work well within a defined wavelength band (e.g., visible, mid-wave infrared (MWIR), long-wave infrared (LWIR), etc.).

The type of optical element materials used in reimaging devices depends on the wavelength band over which the optical system is working and the types of aberration being corrected. For example, chromatic aberration occurs when a lens fails to image all colors at the same focal point. This aberration arises because different lens materials have different refractive indices for different wavelengths of light.

Many types of optical materials have been developed to facilitate the reduction of chromatic aberrations over a certain range of wavelengths. Diffractive optical elements also may be used. By combining two or more lenses of different composition, the degree of aberration correction may be increased. Accordingly, there are many available tools to enhance the performance of an optical reimager, however, considerable shortcomings remain.

One such shortcoming is that currently the degree of aberration correction is limited to a specific wavelength or wavelength region. For example, it may be desirable to correct short-wavelength infrared (SWIR) and mid-wavelength infrared (MWIR) chromatic aberrations. Currently such corrections require at least two optical paths with SWIR chromatic aberrations corrected in a first path and MWIR chromatic aberrations corrected in a second path. Two or more paths have been required because different types of materials are used to correct chromatic aberrations over the different wave bands. More specifically, a strictly SWIR (e.g., 1.0 to 1.6 µm wavelength) optical system is typically color-corrected with optical glass, which transmits well out to approximately 2 µm wavelength. However, a strictly MWIR (e.g., 3.0 to 5.0 µm wavelength) optical system is typically color-corrected with a limited number of infrared materials such as silicon, germanium, zinc selenide, and zinc sulfide. In other words, glass does not transmit MWIR and many commonly used MWIR materials do not transmit SWIR. Therefore, the materials commonly used to chromatically correct optics in the SWIR waveband are significantly different from the common materials used to chromatically correct optics in the MWIR waveband.

Requiring the use of multiple optical paths adds complexity to optical systems that are used for imaging at different wavelengths. Therefore manufacturers and users of such optical systems would benefit from a system which was not as complex.

SUMMARY

Embodiments relate to an optical system and method to correct chromatic aberrations over two wavelength bands within a common optical path. The optical system comprises a plurality of lenses within a same optical path configured to simultaneously pass and focus therethrough short-wave infrared (SWIR) and mid-wave infrared (MWIR) spectral bands to a common focal plane and provide simultaneous correction of monochromatic and chromatic aberrations over the SWIR and MWIR spectral bands.

Another optical system comprises an objective lens group, provided along an optical path, configured to form an intermediate image in two spectral bands and a relay lens group, provided along the optical path of the objective lens group, configured to translate the intermediate image into a final image at a common focal plane in the two spectral bands. The final image is simultaneously focused by at least one of the objective lens group and the relay lens group in the two spectral bands with any monochromatic and chromatic aberrations simultaneously corrected over the two spectral bands by at least one of the objective lens group and the relay lens group.

The method comprises forming an intermediate image simultaneously in a SWIR spectral band and in a MWIR spectral band with an objective lens group provided in within a single optical path. The method further comprises translating the intermediate image into a final image simultaneously in the SWIR spectral band and the MWIR spectral band with a relay lens group provided within the single optical path. The method further comprises focusing the final image simultaneously over the SWIR spectral band and the MWIR spectral band with the relay lens group at a common focal plane. The method further comprises correcting any monochromatic and chromatic aberrations of the final image simultaneously over the SWIR spectral band and the MWIR spectral band at the common focal plane with the objective lens group and the relay lens group.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 shows a table of dispersion data for materials in both the SWIR and MWIR spectral bands;

FIG. 3A shows an illustration of an embodiment of an optical system;

FIG. 3B shows a graph of performance data for the optical system of FIG. 3A over short-wave infrared (SWIR) spectral band;

FIG. 3C shows a graph of performance data for the optical system of FIG. 3A over the mid-wave infrared (MWIR) spectral band;

FIG. 3D shows a data table corresponding to the optical system of FIG. 3A;

FIG. 4A shows an illustration of another embodiment of an optical system;

FIG. 4B shows a graph of performance data for the optical system of FIG. 4A over the SWIR spectral band;

FIG. 4C shows a graph of performance data for the optical system of FIG. 4A over the MWIR spectral band;

FIG. 4D shows a data table corresponding to the optical system of FIG. 4A;

FIG. 5A shows an illustration of another embodiment of an optical system;

FIG. 5B shows a graph of performance data for the optical system of FIG. 5A over the SWIR spectral band;

FIG. 5C shows a graph of performance data for the optical system of FIG. 5A over the MWIR spectral band;

FIG. 5D shows a data table corresponding to the optical system of FIG. 5A;

FIG. 6A shows an illustration of another embodiment of an optical system;

FIG. 6B shows a graph of performance data for the optical system of FIG. 6A over the SWIR spectral band;

FIG. 6C shows a graph of performance data for the optical system of FIG. 6A over the MWIR spectral band;

FIG. 6D shows a data table corresponding to the optical system of FIG. 6A;

DETAILED DESCRIPTION

Figure 2:
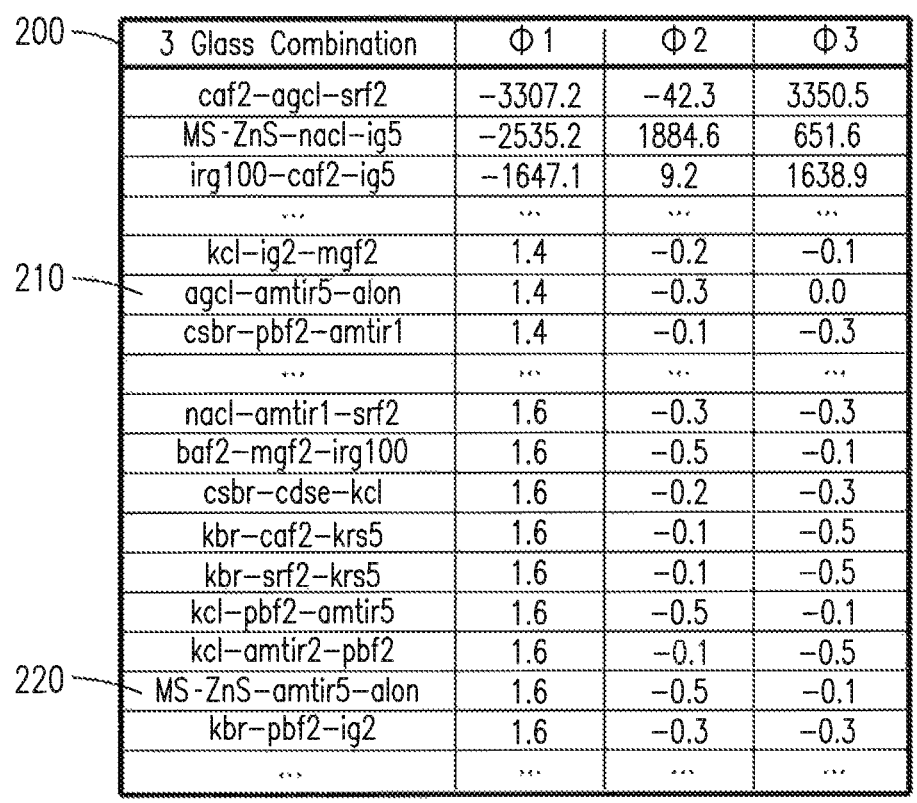
FIG. 2 shows a table of three-material combinations and the relative power distribution to correct chromatic aberration in both SWIR and MWIR spectral bands.

Embodiments are described herein with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, readily recognizes that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a table of performance data for materials in both the SWIR and MWIR spectral wavebands. Specifically, the table 100 illustrates the Abbe numbers for the SWIR and MWIR wavelength bands. The inventors sought to develop an optical system such as, but not limited to, a reimager, which could correct SWIR and MWIR chromatic aberrations within one common optical path. The inventors first sought materials with dispersive properties that could provide chromatic aberration correction simultaneously over both the SWIR and MWIR wavelength spectral bands where all lenses were in a fixed configuration. Dispersion is measured by calculating the Abbe number (i.e., the "V" number) over a given wavelength band. The Abbe number is a measure of a material's dispersion, which is the variation of refractive index with wavelength, with high values of "V" indicating low dispersion, or low chromatic aberration. In other words, the "V SWIR" and "V MWIR" may be considered for constructing an embodiment as disclosed herein.

FIG. 2 shows a table of three-material combinations and the relative power distribution to correct chromatic aberration in both SWIR and MWIR spectral bands. As shown in the table 200, the inventors identified three-material combinations for lens. As provided in the table 200, $\Phi_i$ is the relative lens power of the $i^{th}$ individual lens element of the lens group relative to the lens power of the entire lens group. The intent was to identify combinations where the lens power, or optical power, of one lens element was as close to one as possible and the relative lens power of the other two lens elements was as close to zero as possible. Those skilled in the art will recognize that lens power is a degree to which the lens converges or diverges light. As provided in the table 200, $\Phi_1$ is the relative lens power for the first material listed under the column "3 Glass Combination," $\Phi_2$ is the relative lens power for the second material listed, and $\Phi_3$ is the relative lens power for the third material listed. Ideally, the $\Phi_1$ should be near 1 and $\Phi_2$ and $\Phi_3$ should be close to 0 for combinations of materials to provide chromatic aberration correction over both spectral bands without inducing uncorrectable monochromatic aberration contributions. Based on this desired result, two potential candidates were identified, AgCl-AMTIR5-ALON at 210 and CLEARTRAN®-AMTIR5-ALON at 220, which were used to form starting optical designs.

Though the three combination material worked, the inventors sought to find further combinations capable of obtaining diffraction-limited performance over imposed physical constraints, such as, but not limited to, having the lenses in a fixed configuration. To do so, the inventors investigated adding a fourth material. In a non-limiting embodiment, the fourth material may be added by splitting one of the three-material-combination lenses into two lenses.

Thus, the inventors determined that both three-material combinations and four-material combinations are possible. Each combination of materials is selected based on its ability to simultaneously achromatize both the SWIR and MWIR waveband in a single path with a common focal plane. Further, in some non-limiting examples, diffraction-limited performance over the imposed physical constraints may be desired. In these non-limiting examples, a fourth element in the imaging group may be used.

FIG. 3A is an illustration of an embodiment of an optical system. The optical system 10 comprises a plurality of optical elements in a single, or same, path with a common focal plane and being configured to simultaneously pass therethrough the SWIR and MWIR spectral bands and simultaneously correct monochromatic and chromatic aberrations over the SWIR and MWIR spectral bands. Each optical element may be in a fixed arrangement. More specifically, being in a fixed arrangement means that none of the optical elements are movable when within the optical system, such as not being movable to a first location to accommodate SWIR spectral bands and then being movable to a second location to accommodate MWIR spectral bands.

The term "simultaneously pass" is used to mean that both spectral bands are passed through at the same time wherein correction to monochromatic and chromatic aberrations is occurring at the same time for both spectral bands. Thus, the corrections are occurring with the plurality of optical elements, such as, but not limited to, lenses, remaining in a stationary position with respect to each other when the spectral bands are simultaneously passed therethrough. Furthermore, as used herein, the term "single" is used to mean the "same" or "identical" with respect to an optical path.

As illustrated, these optical elements may be lenses. In particular, the optical system 10 may comprise lens 12, lens 14, lens 16, lens 18, lens 20, lens 22, lens 24, and lens 26. The lenses may be considered being in two groups where a first group 17 is an objective lens group and a second group 19 is a relay lens group. As illustrated, lenses 12, 14, 16, and 18 form the objective group 17 of optical elements whereas lenses 20, 22, 24, and 26 form the relay group 19 of optical elements. Though two lens groups are shown, more lens groups may be utilized. Thus, there may be more than one objective lens group, more than one relay lens group, or more than one lens group that functions as both an objective and relay lens group.

The optical system 10 provides for a single-path dual-band reimager system that is configured to simultaneously pass therethrough the two bands in focus to a common focal plane array (FPA) 31 which is a detector. As disclosed further herein, this occurs based on materials/composition of the lenses. The term "in focus" typically is less than wave front error. The reimager system is designed to aid in near one hundred percent (100%) cold shield efficiency using a cold shield 29.

The lenses in the optical system 10 may be comprised of a number of different types of materials. As a non-limiting example, lenses in the optical system 10 may be comprised of silicon, germanium, zinc selenide, silver chloride, sodium chloride, potassium chloride, chalcogenide glass, potassium bromide, sapphire, magnesium oxide, cesium bromide, spinel, aluminum oxynitride (ALON), water-clear zinc sulfide or multispectral zinc sulfide (MS-ZnS) (e.g., CLEARTRAN®), and other suitable types of materials. Though the trademark term CLEARTRAN® is used herein, this term is not being used to be limiting. Instead it is being used to describe any material comprising water-clear zinc sulfide or multispectral zinc sulfide (MS-ZnS).

As a non-limiting example, when a lens comprises chalcogenide glass, the type of chalcogenide glass used may be AMTIR#, such as, without limitation, AMTIR5™, a product made by Amorphous Materials. In another non-limiting example, the chalcogenide glass may be IG#, such as, without limitation IG6, a product made by SCHOTT North America. Lenses in the optical system 10 may be comprised of the same or different materials, depending on the particular implementation.

In this non-limiting example, four materials may be used for the plurality of lenses in the optical system 10. The lenses 12, 22, and 24 are comprised of silver chloride (AgCl). The lenses 14 and 20 are comprised of a chalcogenide glass such as AMTIR5 and the lenses 16 and 18 are comprised of ALON. Further, the lens 26 is comprised of zinc sulfide (ZnS). As another non-limiting example, the lens 26 may be comprised of CLEARTRAN®. Thus, the four-material combination may comprise CLEARTRAN®, ALON, AgCl, and AMTIR5. In another non-limiting example, other chalcogenide glass formulations also may be used. In another non-limiting example, sapphire may be used in place of ALON.

FIGS. 3B and 3C illustrate graphs of performance data for the optical system 10 of FIG. 3A over the SWIR and MWIR spectral bands. Specifically, in FIG. 3B, a graph 300 shows the characteristics of the optical system 10 with the four-material combination of silver chloride, AMTIR5, ALON, and CLEARTRAN®, as discussed above specific to the SWIR band whereas FIG. 3C show a graph 310 specific to the MWIR band. The x-axis of the graphs 300, 310 represents spatial frequency in line pairs per millimeter (lp/mm), while the y-axis represents modulation transfer function (MTF). A goal is to develop a design with the highest possible MTF curves. The physical limit of performance is the diffraction limit denoted on the curves as "Difflim" 34 that represents a design corrected such that no optical aberrations exist in the design. Thus, having a curve as close as possible to the Difflim curve is preferred. The various lines 36, 38, and 40 are provided along radial field-of-view angles of 0 degrees 36, 4.5 degrees 38, and 6.5 degrees 40. These curves represent points within the field-of-view that are directed through the optical system into the intermediate image plane and ultimately to a common focal plane.

FIG. 3D shows a data table corresponding to the optical system of FIG. 3A. More specifically, the table 320 illustrates the prescription for making the lenses, for both the objective lens group and the relay lens group, illustrated in FIG. 3A, including spacing between the lenses.

Thus as illustrated, an objective lens group is provided along an optical path which is configured to form an intermediate image in two spectral bands. As discussed above, the two spectral bands may be SWIR and MWIR. A relay lens group is provided along the optical path of the objective lens group which is configured to translate the intermediate image into a final image at a common focal plane in the two spectral bands. The final image is focused by the combination of the objective lens group and the relay lens group with any monochromatic and chromatic aberrations corrected over the two spectral bands by at least one of the objective lens group and the relay lens group.

In operation, light having SWIR and MWIR spectral bands is received by the lens 12. The light passes through lenses 14, 16, and 18, which are part of the objective lens group 17. An intermediate image forms at a position 28, or image plane for the detector 31, such as, but not limited to, the focal plane array. Though correction of chromatic and/or monochromatic aberrations occur when passé through the objective lens group, "full" or complete correction may not occur and is not required until the image plane is reached. It is not necessary that each lens group be separately corrected although that could be possible, it is normally an undo constraint. However, if the objective lens group is corrected, then it may be necessary that the relay lens group also be corrected. The same is true if the relay lens group is corrected when then considering the objective lens group. Otherwise the total system may be uncorrected due to the lens group that is not separately corrected.

Chromatic and monochromatic aberrations are further corrected by passing the light through the relay lens group 19, where it is refracted by lenses 20, 22, 24, and 26. The image is then relayed to a detector after being refracted by the lens 26. In this example, the light passes through a window assembly 27 with the location of the cold stop being behind the window 27. This general explanation regarding operation of the optical system 10, is applicable to the embodiments disclosed in FIGS. 4A, 5A, and 6A, as well as other embodiments which provide the features as disclosed herein.

FIG. 4A illustrates the optical system 10 with a different configuration of lenses and combination of materials for the lenses. In this non-limiting example, a different material has replaced the silver chloride. The lenses 12, 22, 24, and 26 may comprise CLEARTRAN®, the lens 14 may comprise a first chalcogenide glass, such as, but not limited to, AMTIR5, the lens 20 may comprise a second chalcogenide glass, such as, but not limited to, IG6, and the lenses 16 and 18 may comprise ALON.

FIGS. 4B and 4C illustrate graphs of performance data for the optical system 10 shown in FIG. 4A. FIG. 4B shows a graph 400 illustrating the characteristics of the material combination of CLEARTRAN®, AMTIR5, IG6, and ALON in the SWIR band, while FIG. 4C show a graph 410 of the characteristic of those materials over the MWIR band. The x-axis and y-axis for both graphs 400, 410 are the same representations (spatial frequency in line pairs per millimeter (lp/mm) for the x-axis and MTF for the y-axis) as disclosed above with respect to FIGS. 3B and 3C.

FIG. 4D shows a data table corresponding to the optical system of FIG. 4A. More specifically, the table 420 illustrates the prescription for making the lenses, for both the objective lens group and the relay lens group, illustrated in FIG. 4A, including spacing between the lenses.

FIG. 5A illustrates yet another configuration of lenses and materials for the optical system 10. As depicted, calcium fluoride has replaced the second chalcogenide glass as the fourth material in the combination. In this example, the lenses 12, 22, and 26 comprise CLEARTRAN®, the lenses 14 and 20 comprise a chalcogenide glass (AMTIR5), the lenses 16 and 18 comprise ALON, and the lens 24 comprises calcium fluoride ($CaF_2$).

FIGS. 5B and 5C illustrate graphs of performance data for the optical system 10 of FIG. 5A. FIG. 5B tracks performance of the material combination of CLEARTRAN®, AMTIR5, calcium fluoride, and ALON in the SWIR band in graph 500. Similarly, FIG. 5C shows performance of the material combination over the MWIR band in graph 510. The x-axis and y-axis for both graphs is the same representation (spatial frequency in line pairs per millimeter (lp/mm) for the x-axis and MTF for the y-axis) as disclosed above with respect to FIGS. 3B and 3C.

FIG. 5D shows a data table corresponding to the optical system of FIG. 5A. More specifically, the table 520 illustrates the prescription for making the lenses, for both the objective lens group and the relay lens group, illustrated in FIG. 5A, including spacing between the lenses.

FIG. 6A illustrates yet another configuration and combination of materials for the optical system 10. As illustrated, ALON is substituted for the material in the lens 24. Thus, the design of the optical system 10 in this embodiment comprises only three types of materials, ALON, CLEARTRAN®, and AMTIR5.

FIGS. 6B and 6C illustrate performance data for the three-material optical system 10. Particularly, FIG. 6B tracks performance of the three-material combination over the SWIR band in graph 600 and FIG. 6C shows performance over the MWIR band in graph 610. The x-axis and y-axis for both graphs is the same representation (spatial frequency in line pairs per millimeter (lp/mm) for the y-axis and MTF for the x-axis) as disclosed above with respect to FIGS. 3B and 3C.

FIG. 6D shows a data table corresponding to the optical system of FIG. 6A. More specifically, the table 620 illustrates the prescription for making the lenses, for both the objective lens group and the relay lens group, illustrated in FIG. 6A, including spacing between the lenses.

Although the embodiments of the optical system 10 in FIGS. 3A, 4A, 5A, and 6A are shown with eight lenses, the figures are in no way meant to limit the number of lenses that may be used. In other embodiments, a different number of optical elements may be implemented in the optical system 10, depending on the functionality involved. As a non-limiting example, a number of additional lenses may be added to the optical system 10, either within a lens group, as another lens group or independent of a particular lens group.

Figure 7:
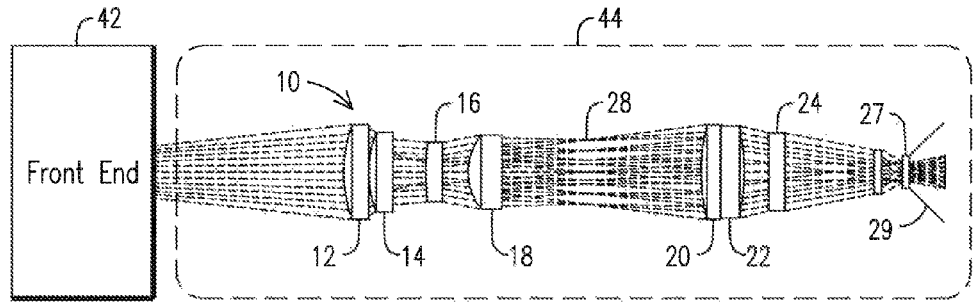
FIG. 7 shows an illustration of an embodiment of a two optical element configuration.

FIG. 7 illustrates a configuration of optical elements for a front end 42 and a back end 44 of a SWIR-MWIR optical device. The optical system 10 is shown as a back end 44 in this example. The optional front end 42 may include a plurality of lenses and mirrors to direct light to the optical system 10. The front end 42 may be a non-focusing system. Though this embodiment shows the optical system as the back end 44, as discussed further herein, the optical system 10 may be the front end (for another system or optical system 10) or a stand along system.

As further illustrated, the back end 44 may include the three-material combination shown in detail in FIG. 3A. Of course, the back end 44 may comprise a different combination of materials as discussed in FIGS. 4A, 5A, 6A, or another combination of materials having the desired characteristics in both the SWIR and MWIR bands.

In an optional front end, light may enter and be reflected by a primary mirror and a secondary mirror. Light proceeds to the back end 44 where it is further refracted to form a final corrected image. Both the optional front end 42 and the back end 44 are optically well-corrected such that the performance of one does not have an adverse impact on the other. The front end 42 and the back end 44 may be designed separately and then mated together.

When multiple optical systems may be combined (such as a front end and a back end) into one larger optical system, reimaging optical systems, as disclosed herein as imaging system 10, may be used to create a real pupil position at the interface of the two optical systems. The single-path dual-band reimager system (back end) relays the image at the cold stop, behind window assembly 27, to the entrance aperture of the front end of the multiple optical systems, in the SWIR and MWIR spectral bands, in order to minimize the size and weight of larger aperture objective lenses. Thus, the single-path dual-band reimager system 10 may be configured to provide near 100% cold shield efficiency to minimize thermal background noise of infrared optical systems.

Thus, embodiments provide multiple configurations and combinations of optical elements for the optical system 10, which may be a reimager or reimager system. Particularly, the various embodiments disclose an eight lens, four-material combination and an eight lens, three-material combination to correct images through both the SWIR and MWIR bands in the same set of optics.

Though SWIR and MWIR spectral bands are discussed above, embodiments of the imaging system 10 may function at other multiple wavebands, including more than two spectral bands. Non-limiting uses of embodiment of the optical system disclosed herein may be particularly important for use in, but not limited to, aircraft systems, missile seeker systems, satellite systems, telescope systems, ground detection systems, imaging systems, etc.

As a non-limiting example with respect to aircraft systems, in an unmanned aerial vehicle, it may be advantageous to use both SWIR and MWIR spectral bands, depending on the performance limitations of the vehicle, the environment, or both. For instance, when looking for higher resolution targets, SWIR waveband may be preferred. Conversely, when looking for a high degree of sensitivity, MWIR waveband may be preferred. With the use of a non-limiting embodiment disclosed herein, the optical system would be equipped with both features in one set of optics, thus decreasing the size, weight, and cost of the system.

The various embodiments provide an optical system with a plurality of optical elements along or within a single path. In an embodiment, at least one optical element comprises aluminum oxynitride (ALON). The configuration of optical elements and the materials selected for those optical elements makes it possible to correct aberrations over multiple infrared wavelengths with one device. As a result, the cost and complexity of the optical system may be reduced while the applicability of a single optical system may be extended to more than one infrared wavelength band.

Figure 8:
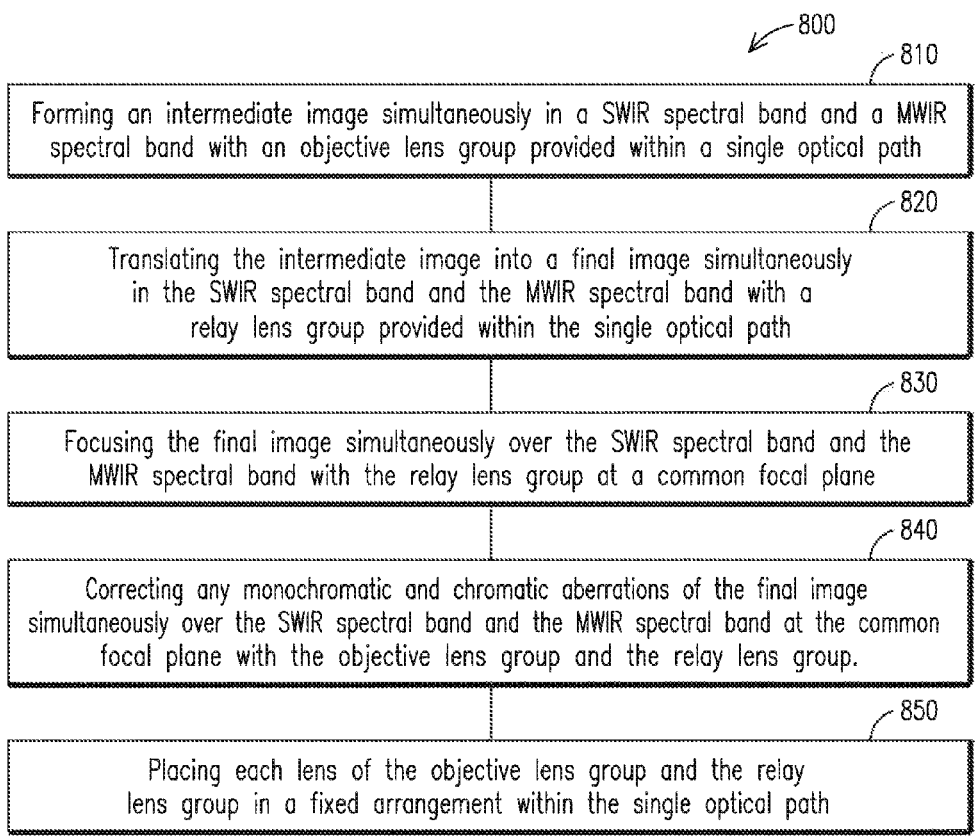
FIG. 8 shows a flowchart of a method.

FIG. 8 shows a flowchart illustrating a method. In use, the method may provide for reimaging a light simultaneously over multiple wavelengths along a single, or same, optical path where aberrations are simultaneously corrected. With respect to SWIR and MWIR spectral bandwidths, the method 800 comprises forming an intermediate image simultaneously in an SWIR spectral band and an MWIR spectral band with an objective lens group provided within a single optical path, at 810. The method 800 also comprises relaying the intermediate image into a final image simultaneously in the SWIR spectral band and the MWIR spectral band with a relay lens group provided within the single optical path, at 820. The method 800 also provides for focusing the final image simultaneously over the SWIR spectral band and the MWIR spectral band with the relay lens group at a common focal plane, at 830. The method 800 also comprises correcting any monochromatic and chromatic aberrations of the final image simultaneously over the SWIR spectral band and the MWIR spectral band at the common focal plane with the objective lens group and the relay lens group, at 840.

The method 800 may also comprise placing each lens of the objective lens group and the relay lens group in a fixed arrangement within the single optical path, at 850. Though the steps of the method are disclosed in a particular order, embodiments are not limited to this particular order.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

What is claimed is:

1. An optical system comprising:
a plurality of lenses, arranged within a same optical path, configured to simultaneously pass and focus therethrough short-wave infrared (SWIR) spectral band from 1.15 microns (μm) to 1.6 μm wavelengths and mid-wave infrared (MWIR) spectral band from 3.3 μm to 5.0 μm wavelengths to a focal plane and provide simultaneous correction of monochromatic and chromatic aberrations over the SWIR and MWIR spectral bands with minimum modulation transfer function (MTF) values greater than 0.4 and less than diffraction limited MTF values over a spatial frequency range of 20 line pairs per millimeter (lp/mm) to 40 lp/mm in the SWIR band and minimum MTF values of greater than 0.1 and less than diffraction limited MTF values over a spatial frequency range of 20 lp/mm to 40 lp/mm in the MWIR band at field of view angles of 0°, 4.5° and 6.5° and wherein at least one lens of the plurality of lenses comprises an aspheric lens made of aluminum oxynitride (ALON);
wherein the plurality of lenses comprises a lens group of at least a three-material combination of three materials, the three materials having a first material of a first lens of the lens group includes $\Phi_1$ having a value of approximately one and second and third lenses of the lens group include second and third materials, respectively, which include $\Phi_2$ and $\Phi_3$, respectively, being approximately zero to provide chromatic aberration correction over the SWIR and MWIR spectral bands without inducing uncorrectable monochromatic aberration contributions; wherein $\Phi_1$ is a relative lens power for the first material relative to the lens power of the lens group, $\Phi_2$ is a relative lens power for the second material relative to the lens power of the lens group and $\Phi_3$ is a relative lens power for the third material relative to the lens power of the lens group and wherein the third material is the ALON and the third lens comprises the aspheric lens; and
wherein the plurality of lenses comprises an objective group and a relay group and at least one of the objective group and the relay group comprising the lens group.

2. The optical system of claim 1, wherein the at least one lens comprises more than one lens comprising the aspheric lens made of the ALON and the plurality of lenses further comprises chalcogenide glass.

3. The optical system according to claim 2, wherein the plurality of lenses further comprises water-clear zinc sulfide.

4. The optical system according to claim 1, wherein the plurality of lenses further comprises a chalcogenide glass.

5. The optical system according to claim 2, wherein the plurality of lenses further comprises silver chloride (AgCl).

6. The optical system according to claim 1, wherein the plurality of lenses further comprises water-clear zinc sulfide and chalcogenide glass.

7. The optical system according to claim 1, wherein the at least one lens of the plurality of lenses comprises at least two aspheric lenses and each of the relay group and the objective group includes one aspheric lens of the two aspheric lenses made of the aluminum oxynitride (ALON).

8. An optical system comprising:
an objective lens group, provided along an optical path, configured to form an intermediate image in two spectral bands wherein the two spectral bands are a short-wave infrared (SWIR) spectral band from 1.15 microns (1.6 μm) to 1.6 μm wavelengths and a mid-wave infrared (MWIR) spectral band from 3.3 μm to 5.0 μm wavelengths; and
a relay lens group, provided along the optical path of the objective lens group, configured to translate the intermediate image into a final image at a focal plane in the two spectral bands;
wherein the final image is simultaneously focused by at least one of the objective lens group and the relay lens group in the two spectral bands with any monochromatic and chromatic aberrations simultaneously corrected over the two spectral bands by at least one of the objective lens group and the relay lens group with minimum modulation transfer function (MTF) values greater than 0.4 and less than diffraction limited MTF values over a spatial frequency range of 20 line pairs per millimeter (lp/mm) to 40 lp/mm in the SWIR band and minimum MTF values of greater than 0.1 and less than diffraction limited MTF values over a spatial frequency range of 20 lp/mm to 40 lp/mm in the MWIR band at field of view angles of 0°, 4.5° and 6.5°.

9. The optical system according to claim 8, wherein at least one lens in at least the objective lens group and the relay lens group comprises a first lens comprising aluminum oxynitride (ALON) and a second lens of the plurality of lenses comprises chalcogenide glass.

10. The optical system according to claim 8, wherein at least one lens in at least the objective lens group and the relay lens group comprises water-clear zinc sulfide.

11. The optical system according to claim 8, wherein at least one lens in at least the objective lens group and the relay lens group comprises a chalcogenide glass.

12. The optical system according to claim 8, wherein at least one lens in at least the objective lens group and the relay lens group comprises silver chloride (AgCl).

13. The optical system according to claim 9, wherein at least one of the objective lens group and the relay lens group comprises a plurality of lenses comprising a respective lens group of at least a three-material combination of three materials, the three materials having a first material which includes $\Phi_1$ having a value of approximately one and the first and second lenses include second and third materials, respectively, which include $\Phi_2$ and $\Phi_3$, respectively, being approximately zero to provide chromatic aberration correction over the two spectral bands without inducing uncorrectable monochromatic aberration contributions; wherein $\Phi_1$ is a relative lens power for the first material relative to the lens power of the respective lens group, $\Phi_2$ is a relative lens power for the second material relative to the lens power of the respective lens group and $\Phi_3$ is a relative lens power for the third material relative to the lens power of the respective lens group.

14. The optical system according to claim 8, wherein a combination of lenses in at least one of the objective lens group and the relay lens group comprises a lens comprising water-clear zinc sulfide, a lens comprising aluminum oxynitride (ALON), and a lens comprising chalcogenide glass.

15. A method, comprising:
forming an intermediate image simultaneously in a short-wave infrared (SWIR) spectral band from 1.15 microns (μm) to 1.6 μm wavelengths and in a mid-wave infrared (MWIR) spectral band from 3.3 μm to 5.0 μm wavelengths with an objective lens group provided within a single optical path;

translating the intermediate image into a final image simultaneously in the SWIR spectral band and the MWIR spectral band with a relay lens group provided within the single optical path;

focusing the final image simultaneously over the SWIR spectral band and the MWIR spectral band with the relay lens group at a focal plane; and correcting any monochromatic and chromatic aberrations of the final image simultaneously over the SWIR spectral band and the MWIR spectral band at the focal plane with the objective lens group and the relay lens group with minimum modulation transfer function (MTF) values greater than 0.4 and less than diffraction limited MTF values over a spatial frequency range of 20 line pairs per millimeter (lp/mm) to 40 lp/mm in the SWIR band and minimum MTF values of greater than 0.1 and less than diffraction limited MTF values over a spatial frequency range of 20 lp/mm to 40 lp/mm in the MWIR band at field of view angles of 0°, 4.5° and 6.5°.

16. The method according to claim 15, wherein at least one of the objective lens group and the relay lens group comprises a first lens comprising aluminum oxynitride (ALON) and a second lens of the plurality of lenses comprises chalcogenide glass.

17. The method according to claim 16, wherein at least one of the objective lens group and the relay lens group comprise a plurality of lenses comprising a respective lens group of at least a three-material combination of three materials, the three materials having a first material which includes $\Phi_1$ having a value of approximately one and the first and second lenses include second and third materials, respectively, which include $\Phi_2$ and $\Phi_3$, respectively, being approximately zero to provide chromatic aberration correction over the two spectral bands without inducing uncorrectable monochromatic aberration contributions; wherein $\Phi_1$ is a relative lens power for the first material relative to the lens power of the respective lens group, $\Phi_2$ is a relative lens power for the second material relative to the lens power of the respective lens group and $\Phi_3$ is a relative lens power for the third material relative to the lens power of the respective lens group.

* * * * *

UNITED STATES PATENT AND TRADEMARK OFFICE
CERTIFICATE OF CORRECTION

PATENT NO. : 9,946,053 B1
APPLICATION NO. : 14/268318
DATED : April 17, 2018
INVENTOR(S) : James Alexander Fry and Robert Joseph Murphy It is certified that error appears in the above-identified patent and that said Letters Patent is hereby corrected as shown below:

In the Claims

Column 12, Claim 8, Line 6, delete "1.6" (first occurrence).

Signed and Sealed this
Fifth Day of June, 2018

Andrei Iancu
*Director of the United States Patent and Trademark Office*